Patented May 26, 1942

2,284,106

UNITED STATES PATENT OFFICE 2,284,106

PROCESS FOR TREATING PETROLEUM OIL EMULSIONS

Bert A. Stagner, Long Beach, Calif.

No Drawing. Application October 3, 1939, Serial No. 297,712

10 Claims. (Cl. 252—330)

This invention relates to the treatment of impure petroleum oils, residues, and products, and in particular to the demulsification of petroleum oil products containing solid and semi-solid organic oxidation products and water in an emulsified condition such as in crude oil residues, used lubricating oil mixtures, tank settlings, and the like.

My invention is particularly applicable to the lubricating oil mixtures resulting from the accumulation of used or spent lubricating oils and greases from gasoline engines, in which water from various sources has become emulsified in a form difficult to "break." These spent oils, as ordinarily accumulated at automobile service stations, contain many kinds of oils with asphalt, gums, and oxidation products from combustion, or from originally contained impurities, and being also contaminated by greases, and "flushing" oils used in washing out gears, motors, etc. The water in these products varies up to about twenty percent by weight.

Also, certain residues from other treatments of crude petroleum products, and tank settlings from crude oil, contain various kinds of impurities of a heterogenous nature including not only suspended solid particles, but also very stable emulsions of the water-in-oil type, some being the "rejects" from previous chemical treatment used to dehydrate the large part of the oil and containing a high percentage of the reagents and the impurities of the original.

These residues and settlings are often accumulated and stored for months or years in open earthen reservoirs under the oxidizing conditions of air and sunlight, with further increases in dirt and water, increasing the difficulty of separating the water and recovering the oil.

The spent lubricating oil emulsions previously described are also strongly stabilized by the presence of asphaltic and related materials, and by the soaps and other compounds which are derived not only from the spent lubricants but also from the greases usually present in such accumulated spent oil. The mixtures are variable and complex, and it has heretofore not usually been economical to recover the oil. The usual dehydrating processes are ineffectual or inefficient and costly when applied to these materials.

Very often this type of material is accumulated in large sumps and kept warmed to about 150° F. for long periods of time, which treatment results in a partial separation of the oil which may be skimmed off, the recovery being sometimes as high as sixty percent, but usually much less. The remainder has usually been discarded if a suitable place for disposal could be arranged, or it is sold at very low prices for weed eradication, etc. This residue, as well as the original accumulation of spent oils, and also the unbroken emulsion residues from the usual chemical dehydrating processes, or electrical precipitation processes for emulsions, may be successfully treated by my process.

I have found that these difficult-to-break type emulsions may be readily demulsified by treating them with certain strong solutions of sodium silicate and caustic soda. I have found that these emulsions, if held at temperatures of 150 to 210° F. may be completely broken down by commingling with them from about one to three volumes of my reagent to each 400 volumes of the oil emulsion, the amount depending upon the particular emulsion being treated. After this treatment, substantially all of the oil separates after a few hours in a layer which may be drawn off and further refined as required, by other refining processes. The solid matter, water, and reagent products settle and may be discarded.

In the treatment of the used or spent lubricating oil mixtures as above described, I have found that a very high alkalinity is most efficient. For these materials, I prefer to use mixtures of concentrated sodium silicate and concentrated caustic soda in such proportions that there will result a reagent in which the molecular ratio of sodium oxide to silica is about 1.67 to 1.0. In one case, I have used a reagent containing equal volumes of commercial sodium silicate ($Na_2O$, 3.25 $SiO_2$) solution and a fifty percent caustic soda solution to break the emulsion of a spent lubricating oil mixture, about three volumes of the reagent being added to 400 volumes of the oil emulsion mixture, the temperature being maintained for several hours from 150 to 210° F. to permit settling out of the substantially oil-free residue.

Mixtures of other sodium silicate solutions and caustic soda solutions of different strengths may be employed with suitable proportioning to give substantially the preferred ratio of sodium oxide to silica in the reagent. Other highly alkaline mixtures of sodium silicate and sodium hydroxide may also be used in this treatment of spent lubricating oil mixtures, and while not so economical nor efficient, I have found that the molecular ratio may be as low as .7 $Na_2O$ to 1 $SiO_2$, and as high as 2 $Na_2O$ to 1 $SiO_2$.

The use of strong aqueous solutions is important, and the efficiency of my process depends much upon this. While weaker solution mixtures may be used than in my preferred reagent, larger quantities of silicate and caustic soda are required for a given quantity of oil, with consequent greater cost of treatment and with lower recovery of oil. A dilution of the concentrated reagent with 5 to 8 volumes of water will in general lower its efficiency by fifty percent or more in the quantity of reagent required, and a dilution of the reagent with 50 volumes of water completely nullifies its value in my process.

In the treatment of crude oil emulsions, tank settlings etc. of the above described character, a strongly alkaline sodium silicate-caustic soda mixture is desirable, the most efficient range being from .7 $Na_2O$ to 2.0 $Na_2O$ for each molecule of silica. For example, I have treated a California crude oil emulsion which had been stored for about fifteen years and contained about fifty percent of water, by mixing with 100 volumes of the warm emulsion about 2 volumes of my reagent consisting of concentrated sodium silicate solution and concentrated caustic soda in proportion to give a ratio of 1.68 $Na_2O$ to 1 $SiO_2$, and allowing the mixture to stand for several hours, after which the oil is practically completely separated above the non-oily layer containing the impurities and reagent.

In another case, I successfully treated a similar type crude oil emulsion which had been exposed to the weather in an open tank for about six months and contained about fifteen percent water, with one percent by volume of a reagent made by mixing 3 volumes of "N" brand sodium silicate with 1 volume of 50% caustic soda solution.

Demulsification by the use of my reagent may be effected at atmospheric pressure at temperatures from 150 to 210° F.; but the coalesced water particles will settle through the oil more rapidly if the whole operation is conducted at higher temperatures and under sufficient pressure to prevent ebullition and agitation. Temperatures as high as 280° F. have been successfully used. The more rapid settling of the coalesced water particles in hot oil is, of course, largely due to the decreased viscosity of the oil. The handling of oils under pressure during treatment in continuous or semi-continuous equipment is well known in the oil industry, and these methods may be employed in using my reagent.

Since the concentrated commercial solutions of sodium silicate, if mixed with from one-third to an equal volume of a fifty percent caustic solution will solidfy under cool atmospheric temperatures in a short time, it can conveniently be stored and delivered to the oil in mixed form by keeping it sufficiently warm to prevent solidification. The warm or hot ready mixed reagent may be handled and marketed in this form. I prefer, however, to keep the two concentrated solutions in separate reservoirs, and by means of proportioning pumps, forcing the required amounts together into a short common pipe that leads into the hot oil. The mutual solubility of the two chemicals creates sufficent heat to prevent immediate solidification.

I have found the following operation to be satisfactory for applying my method on a large scale. The emulsified oil from a storage sump in a large reclaiming plant was pumped through a tubular still furnace which had one continuous two-inch pipe therein. The oil was heated to 180 to 200° F. in passing through this pipe, and as it emerged from the furnace, it was commingled with the mixed chemicals being continuously delivered into a short side pipe from proportioning pumps and storage tanks, and the treated oil delivered to a settling tank where the warm oil rose to the top in 10 to 24 hours substantially free from water and solid materials. Various means of mixing the chemicals with the oil to be treated may be employed, it being only necessary to bring the reagent into sufficient contact with the emulsified oil to cause the "breaking" to be effected. Violent agitation is to be avoided.

While I prefer to use natural settling to effect separation of the oil and the non-oil layers, other methods such as centrifuging, may be employed.

While I have described several illustrative applications of my method, I do not restrict my invention to these particular cases, and limit my invention only insofar as required by the prior art and the spirit of the appended claims.

I claim:

1. The process of treating mineral oil materials containing refractory water-in-oil emulsions of the types present in tank bottoms and/or in used lubricating oils comprising mixing therewith a strong aqueous reagent consisting of commercial sodium silicate and caustic soda in proportions such that in the mixture the ratio of sodium oxide to silicon dioxide is not less than about .7.

2. The process of treating mineral oil materials containing refractory water-in-oil emulsions of the types present in tank bottoms and/or in used lubricating oils comprising mixing therewith a reagent consisting of substantially equal volumes of commercial concentrated sodium silicate aqueous solution and concentrated caustic soda aqueous solution.

3. The process of treating mineral oil materials containing refractory water-in-oil emulsions of the types present in tank bottoms and/or in used lubricating oils comprising mixing therewith a reagent consisting of substantially equal volumes of commercial concentrated sodium silicate aqueous solution and concentrated caustic soda aqueous solution, and separating the oil from the substantially non-oil-containing residue.

4. The process of treating refractory mineral oil emulsions containing water of the types present in tank bottoms and/or in used lubricating oils comprising mixing therewith a strong solution of a reagent consisting of an aqueous solution of commercial sodium silicate and caustic soda in proportions such that the molecular ratio of sodium oxide to silicon dioxide is within the range from .7 to 2.0 of sodium oxide to 1.0 of silicon dioxide.

5. The process of dehydrating and purifying used lubricating oil mixtures containing water-in-oil emulsions, comprising heating the oil mixture to a temperature of 150 to 210° F., commingling with each 400 volumes of said oil mixture about 1 to 3 volumes of a concentrated solution of a reagent composed of commercial sodium silicate to which has been added an equal volume of concentrated caustic soda aqueous solution, allowing the commingled mass to stand until the water and impurities separate from the oil, and separating the oil.

6. The process of dehydrating and purifying tank bottom oil mixtures containing refractory water-in-oil emulsions, comprising heating the oil mixture to a temperature of 150 to 210° F., commingling with each 400 volumes of said oil mixture about 1 to 3 volumes of a strong solution of a reagent composed of commercial sodium silicate to which has been added an equal volume of concentrated caustic soda solution, alllowing the commingled mass to stand until the water and impurities separate from the oil, and separating the oil.

7. The process of dehydrating and purifying used lubricating oil mixtures containing water-in-oil emulsions, comprising heating the oil mixture to a temperature of 150 to 210° F., commingling with each 400 volumes of oil mixture an amount of strong sodium silicate-caustic soda reagent equivalent to from 1 to 3 volumes of a mixture of equal parts of commercial sodium silicate and fifty percent caustic soda solution, allowing the commingled mass to stand until the water and impurities separate from the oil, and separating the oil.

8. A process of demulsifying petroleum products containing refractory water-in-oil emulsions of the types present in tank bottoms and/or in used lubricating oils, comprising heating the products to a temperature of 150 to 210° F. commingling with each 400 volumes of said products about 1 to 3 volumes of a reagent consisting of commercial sodium silicate to which has been added an equal volume of concentrated caustic soda aqueous solution, allowing the commingled mass to stand until the water and impurities separate from the oil, and separating the oil.

9. The process of treating mineral oil materials containing refractory water-in-oil emulsions of the types present in tank bottoms and/or in used lubricating oils comprising mixing therewith a reagent composed of substantially equal amounts of concentrated commercial sodium silicate solution and concentrated caustic soda aqueous solution, and separating the oils from the substantially non-oil-containing residue, the amount of reagent used being such that said residue is strongly alkaline.

10. A process of demulsifying petroleum products containing rafractory water-in-oil emulsions of the types present in tank bottoms and/or in used lubricating oils, comprising heating the products to a temperature of 150 to 210° F., commingling with each 400 volumes of said products about 1 to 3 volumes of a reagent consisting of commercial sodium silicate to which has been added an equal volume of concentrated caustic soda aqueous solution, allowing the commingled mass to stand until the water and impurities separate from the oil, and separating the oil, the amount of reagent used being such that the separated water is strongly alkaline.

BERT A. STAGNER.